US008611848B2

(12) United States Patent
Smith

(10) Patent No.: US 8,611,848 B2
(45) Date of Patent: *Dec. 17, 2013

(54) METHOD AND SYSTEM FOR PROVIDING TIERED ACCESS TO COMMUNICATION NETWORK RESOURCES

(75) Inventor: Clint Smith, Warwick, NY (US)

(73) Assignee: Rivada Networks LLC, Arlington, VA (US)

( * ) Notice: Subject to any disclaimer, the term of this patent is extended or adjusted under 35 U.S.C. 154(b) by 69 days.

This patent is subject to a terminal disclaimer.

(21) Appl. No.: 13/545,568

(22) Filed: Jul. 10, 2012

(65) Prior Publication Data

US 2012/0282879 A1 Nov. 8, 2012

Related U.S. Application Data

(63) Continuation of application No. 12/273,146, filed on Nov. 18, 2008, now Pat. No. 8,275,349.

(60) Provisional application No. 60/990,938, filed on Nov. 29, 2007, provisional application No. 61/032,010, filed on Feb. 27, 2008, provisional application No. 61/038,451, filed on Mar. 21, 2008.

(51) Int. Cl.
    *H04M 11/04* (2006.01)
(52) U.S. Cl.
    USPC ......................................... 455/404.1; 370/338

(58) Field of Classification Search
    USPC ........................................ 455/450; 370/395.2
    See application file for complete search history.

(56) References Cited

U.S. PATENT DOCUMENTS

| | | | |
|---|---|---|---|
| 6,650,619 B1 | 11/2003 | Schuster et al. | |
| 2003/0223431 A1* | 12/2003 | Chavez et al. | 370/395.42 |
| 2005/0026622 A1* | 2/2005 | Georgeaux et al. | 455/450 |
| 2007/0004421 A1 | 1/2007 | Chambers et al. | |
| 2007/0139182 A1 | 6/2007 | O'Connor et al. | |
| 2007/0254623 A1 | 11/2007 | Branda et al. | |
| 2007/0275690 A1 | 11/2007 | Hunter et al. | |
| 2008/0010674 A1 | 1/2008 | Lee | |
| 2008/0261554 A1* | 10/2008 | Keller et al. | 455/404.1 |

* cited by examiner

*Primary Examiner* — Marcos Batista
(74) *Attorney, Agent, or Firm* — The Marbury Law Group, PLLC

(57) ABSTRACT

Methods and systems automatically allocate cellular communication network resources to emergency response personnel during emergency situations which are detected by call volumes exceeding a predetermined maximum. Access to cellular communication network resources is provided by dedicating a portion of communication channels to emergency response personnel use. By reserving whole communication channels for emergency communication purposes, emergency personnel are able to both initiate and receive calls from both other mobile devices as well as conventional landline telephone stations. Qualified emergency response personnel can preregistered their phones and be assigned personal identification numbers to enable access to allocated network resources. Users can also be registered "on the fly."

24 Claims, 8 Drawing Sheets

METHOD AND SYSTEM FOR PROVIDING TIERED ACCESS TO COMMUNICATION NETWORK RESOURCES

RELATED APPLICATIONS

This application is a continuation of U.S. patent application Ser. No. 12/273,146 entitled "Method and System for Providing Tiered Access to Communication Network Resources" filed on Nov. 18, 2008 that issued as U.S. Pat. No. 8,275,349, which claims the benefit of priority to U.S. Provisional Patent Application No. 60/990,938 filed Nov. 29, 2007, U.S. Provisional Patent Application No. 61/032,010 filed Feb. 27, 2008, and U.S. Provisional Patent Application No. 61/038,451 filed Mar. 21, 2008, the entire contents of each of which are hereby incorporated by reference for all purposes.

FIELD OF THE INVENTION

The present invention relates generally to cellular telephone technologies and more particularly to a system and method for providing emergency response personnel tiered priority access to cellular communication network resources.

BACKGROUND

The popularity of cellular communication devices has dramatically increased in recent years. This increase in popularity is due in large part to the advancement of technology and the decreasing cost of equipment and services. Many, if not most, people own or use a mobile device with cellular communication capability on a daily basis. As a result of the growing customer base, cellular communication service providers have responded by dramatically increasing their infrastructure and network coverage so as to support the increased demand.

Cellular communication service providers have endeavored to improve their cellular communication networks by increasing bandwidth to accommodate the increasing number of cellular communication customers. Nevertheless, there is still not enough bandwidth to accommodate every mobile device user at the same time. Indeed, the cellular communication network's basic design is premised on the assumption that not every mobile device user will attempt to access the cellular communication network at the same time. Thus, cellular communication networks are sized and deployed to accommodate a subset of mobile device users at any given moment. In other words, cellular communication networks are not intended to permit every mobile device user to access the network at the same time. Instead, service providers assume that only a relatively small percentage of its mobile device users use the cellular communication network at the same time.

Ordinarily, service provider assumptions are correct and cellular communications networks accommodate all mobile device users. However, events can sometimes prompt people to reach for their mobile devices at the same time, overloading the network's capacity. For example, if an accident occurs during rush hour, a dozen witnesses may call the police at the same time to report the accident, while the resulting traffic delay prompts hundreds of others to call the office, their families or their appointments to say they will be late. In instances where the number of subscribers accessing the cellular communication network exceeds the network's capacity, some subscribers may be denied service and callers trying to reach subscribers within the overloaded cell zone will receive a message to the effect that "all circuits are busy, try again later."

In most everyday instances, the average mobile device call is truly not urgent. As such, it is normally only a minor inconvenience when a mobile device call is not connected through on the first attempt. However, this may not be true for all mobile device calls. For example, emergency response personnel attempting to respond to a traffic accident may need to send and receive mobile device calls in order to render assistance. In such cases and for such users the reliability of their mobile devices may literally be a matter of life and death. Yet it is human nature to reach for the mobile device in an emergency situation, the very instant when emergency responders need reliable communications. Thus, cellular communication networks should be able to provide emergency response personnel with reliable cellular communications even when heavy call volume exceeds the capacity of the cellular communication network.

One response to this need is Wireless Priority Access (WPA) which provides emergency response personnel with priority access to commercial cellular communication networks during times of emergency. In order to use WPA, emergency response personnel must pre-register their mobile devices with their cellular communication network service provider. Then, if the pre-registered emergency response personnel user is unable to access the cellular communication network because of increased call volume, the user can dial *272+Destination Number and push the SEND key (Example: *272 703 650 0100+SEND). The cellular communication network equipment will recognize the *272 prefix as a WPA access request and search a database for the mobile device's unique identification number to confirm that the mobile device is entitled to priority access. If the mobile device is properly authorized, the call will be given priority in the network queue, enabling the user to complete the call.

The WPA system is not without its problems, however. For one, WPA is meant only for key leadership personnel and their direct supporting staff who are in national security and emergency response leadership positions. In order to be authorized for WPA, the mobile device must belong to/be in control of a user who is one of the following: 1) Executive Leadership and Policy Makers; 2) Disaster Response/Military Command and Control; 3) Public Health, Safety, and Law Enforcement Command; 4) Public Services/Utilities and Public Welfare; and 5) Disaster Recovery. Further, a WPA authorized user's position in the call queue will depend on the user's position in the hierarchy above.

From the listing above, it can be seen that WPA is unavailable to most emergency response personnel. As a result many "on the ground" emergency personnel may be left without cellular communication access just as if they are members of the general public. Yet the emergency personnel who are the first to respond to an emergency situation are the ones who need reliable communication access the most. Thus, WPA fails to satisfy the most common and likely situations in which preferred access to cellular communications networks is required.

Another problem with WPA is that the system only provides one way access to cellular communication networks. That is to say, WPA only allows authorized mobile devices to place a call in times of increased call volume by placing its call request ahead in the queue. Those trying to call an authorized mobile device will hear that the networks are busy. Additionally, the priority access in the queue only insures that a call initiated by the WPA authorized mobile device to a landline based telephone stations, denying use of mobile devices for coordination of on-site personnel. These limitations undercut the value of mobile devices as ubiquitous mobile communications devices.

SUMMARY

The various embodiment methods and systems automatically provide emergency response personnel with tiered priority access to cellular communication networks during situations that create periods of increased call volume. Embodiments disclosed herein provide access to cellular communication network resources by dedicating a portion of communication channels to emergency response personnel. Access to the cellular communication network resources may be provided to both initiate and receive calls from other mobile devices as well as conventional landline telephone stations. Emergency response personnel who have not pre-registered for such access may obtain such emergency access "on the fly." Further, embodiment systems and methods may demobilize cellular communication network resources as an emergency situation is alleviated and call volume returns to normal levels.

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention.

DETAILED DESCRIPTION

Figure 1:
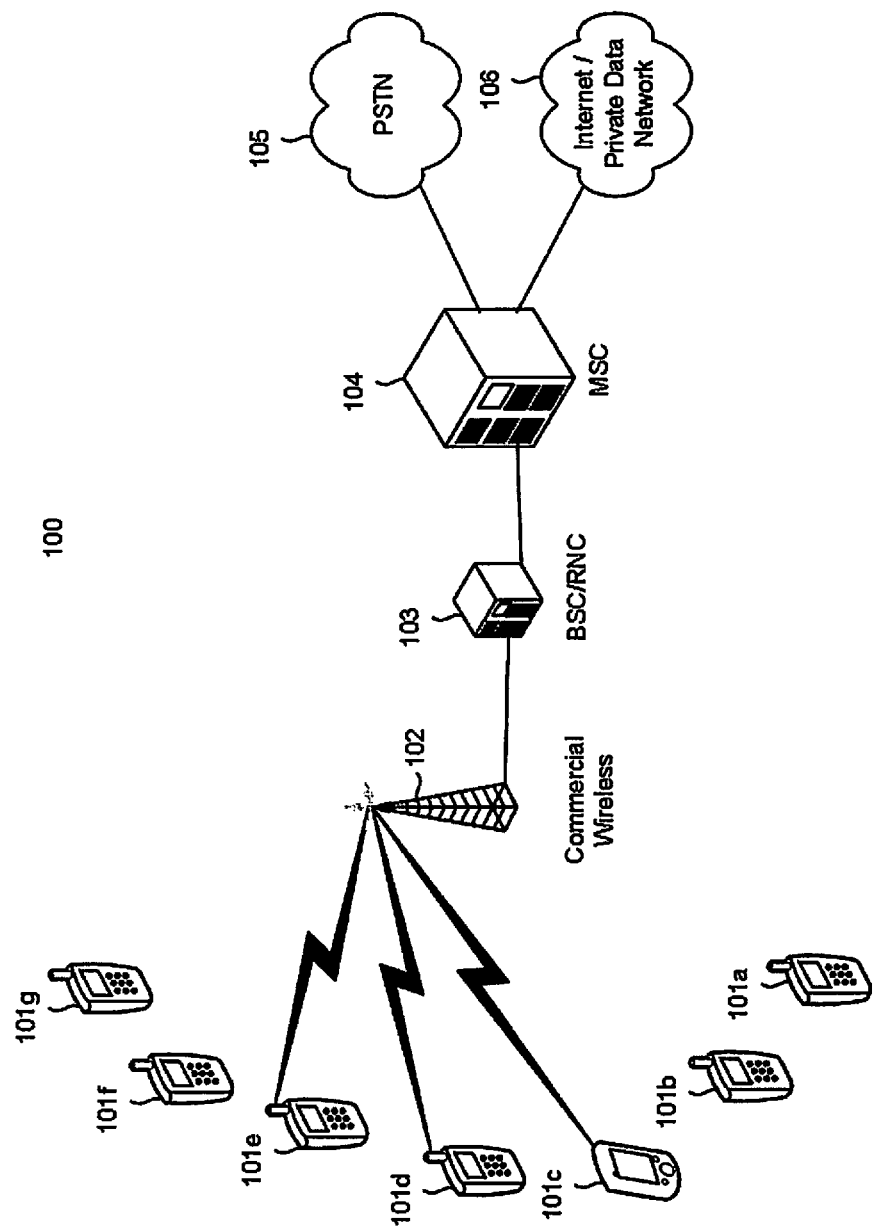
FIG. 1 is a system block diagram illustrating call volume requests made to a cellular communication network under normal conditions.

Various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

As used herein, the term "mobile device" refers to any one of various cellular telephones, personal data assistants (PDA's), palm-top computers, laptop computers with wireless modems, wireless electronic mail receivers (e.g., the Blackberry® and Treo® devices), multimedia Internet enabled cellular telephones (e.g., the iPhone®), and similar personal electronic devices. A mobile device may include a programmable processor and memory. In a preferred embodiment, the mobile device is a cellular handheld device (e.g., a mobile device), which can communicate via a cellular telephone communications network.

A high priority in responding to any emergency or disaster situation is establishing effective communications. In large scale emergency or disaster (both manmade and natural) situations, it is paramount to maintain communications between all first responders and emergency personnel in order to respond, manage, and control the emergency situation effectively. In the absence of effective communication among first responders and other emergency personnel, resources may not be effectively mobilized to the areas which need the resources most. Even in minor emergency situations (e.g., traffic accidents and fires), first responders must be able to call on support assets and coordinate with other services (e.g., public utilities, hospitals, etc.).

With the ubiquity of mobile device ownership and usage, emergency communication via mobile devices using commercial cellular communication networks often are the most efficient and effective means to mobilize emergency response personnel and resources. Enabling mobile devices to provide effective emergency communications obviates the technical challenges and expense of coordinating radio frequencies among various first responder agencies (e.g., police, fire, ambulance, FEMA, public utilities, etc.). Also, qualified first responders to an accident who are off duty or not ordinarily equipped with radios (e.g., doctors, nurses, retired police, or military personnel) will have or can quickly borrow a mobile device.

Emergency communications over cellular communication networks is not without problems, however. As discussed above, cellular communication networks ("networks") are designed to accommodate access requests from only a fraction of the total number of mobile devices in a particular cell. At times of emergency or crisis, network resources may become overtaxed when predictable human responses to the situation prompt an extraordinary number of mobile device users within a particular cell to access the network at the same time. Mobile device users may be attempting to alert emergency personnel of the emergency situation (such as a 911 emergency call) or to alert friends or family members that the user is safe despite being in the area of an emergency situation. Some users may be transmitting images of the emergency condition (fire, accident, etc.) to news services or friends. In a wide scale situation, emergency responders using mobile devices for emergency communications will add to the call volume. Regardless, the predictable increase in call volume during an emergency situation can overwhelm a commercial cellular communications network, particularly in the cell zone encompassing the emergency, thus rendering the network unreliable for emergency response personnel communication usage.

To illustrate the problem, consider the case of a traffic accident occurring on the highway. FIG. 1 illustrates a cellular communication network under normal conditions. As illustrated, multiple mobile devices 101(*a-g*) are wirelessly connected to the cellular communication network via a base station 102 servicing a particular cell 100. The base station 102 connects via a base station controller (BSC)/radio network controller (RNC) 103 to a Mobile Switching Center (MSC) 104. The MSC 104 contains both a public switched telephone network (PSTN) interface and an internet interface.

Calls made to and from any of the multiple mobile devices 101(a-g) may be routed via conventional landlines over the PSTN 105 or Internet 106 using Voice Over Internet Protocol (VOIP). Calls between conventional landline telephone stations and any one of mobile devices 101(a-g) may be routed over via the PSTN or Internet 106. Calls between mobile devices 101(a-g) may be routed over the PSTN or Internet 106 to similar MSC 104, BSC/RNC 103, and base station 102 located near the initiating or intended mobile device 101(a-g).

FIG. 1 illustrates the typical situation in which a fraction of the mobile devices within a cell access the network at the same time. For example, FIG. 1 shows seven separate mobile devices 101(a-g) located within the cell, only three of which (101c, 101d, and 101e) are currently accessing the network. Thus, the network is operating well within its operating parameters and all requests to the network from mobile devices 101(a-g) are granted. It is noted that all mobile devices 101(a-g) that are turned on but not in use continue to communicate with the base station 102 via a link management channel (not illustrated). The network uses these communications to keep track of the mobile devices 101(a-g) within each cell to support call routing. However, the amount of information communicated between all mobile devices 101(a-g) and the base station 102 for such tracking purposes is small (particularly in contrast to the bandwidth required for a normal telephone call), so the number of on-but-inactive mobile devices 101 within a cell normally will not overwhelm the network.

Figure 2:
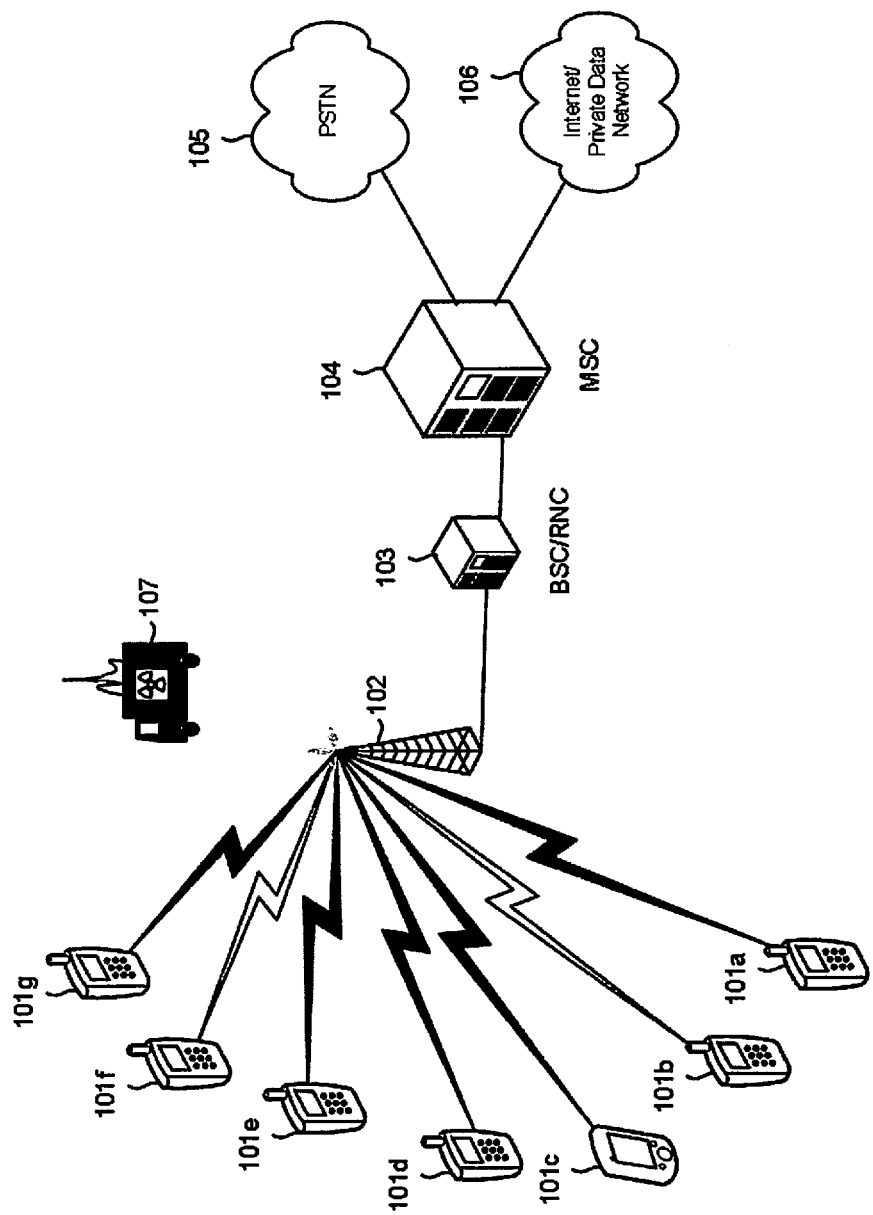
FIG. 2 is a system block diagram illustrating call volume requests made to a cellular communication network under an emergency situation condition.

This normal functioning of the cellular network can be disrupted when, for example, an accident stops traffic, prompting delayed drivers to simultaneously use their mobile devices to alert emergency personnel of the traffic accident (e.g., emergency 911 call, etc.) or contact friends, family members, business associates, etc., to inform them of the delay. FIG. 2 illustrates a cellular communication network in such an emergency situation. In this illustration, a truck 107 in the vicinity of base station 102 is on fire. Predictably, the truck 107 fire prompts most of the mobile devices 101(a-g) users within the vicinity to access the cellular network at approximately the same time. This causes an overload condition in the cell by exceeding the bandwidth of the carriers on the local base station 102. Consequently, some of the mobile devices 101b, 101f will not be granted access to the network, and new network access requests may be denied until communication channels open up. This communication bottleneck may worsen the emergency situation by delaying the response by emergency personnel and denying first responders with effective communication over the network.

This problem is exacerbated in disaster situations involving many victims and large areas, such as wildfires, floods, hurricanes, tornados and terrorist attacks. As witnessed during the September 11 attack and Hurricane Katrina, large disasters can destroy part of the cellular and landline telephone network infrastructure, leaving the remaining network more vulnerable to overload conditions. Network overloads during disaster events are particularly troublesome since such situations naturally involve widespread confusion and require close coordination among a large number of emergency and relief personnel.

If a disaster situation will persist long enough (e.g., a flood or hurricane situation), additional cellular communication capacity can be added to a region by activating a deployable cellular communication system to provide emergency response teams and personnel with the ability to communicate. Such recently developed deployable units, referred to herein as a "switch on wheels," can include a CDMA2000 base station and switch, Land Mobile Radio (LMR) interoperability equipment, a satellite Fixed Service Satellite (FSS) for remote interconnection to the Internet and PSTN, and, optionally, a source or remote electrical power such as a gasoline or diesel powered generator. A more complete description of an example deployable switch on wheels is provided in U.S. patent application Ser. No. 12/249,143, filed Oct. 10, 2008, the entire contents of which is hereby incorporated by reference in their entirety.

These switch on wheels are effectively mobile cellular base stations which may be deployed in a disaster area and operate as a cellular tower antenna. The switch on wheels sends and receives communication signals from a plurality of mobile devices 101 and serves as a gateway portal to the rest of the conventional communications infrastructure. Communications between the switch on wheels and a mobile device 101 is broken down into packets for transport as a VOIP communication, and then transmitted via satellite to a ground station outside the disaster area from which the call is forwarded through the telephone network to the recipient. Even with the added bandwidth provided by deployable switch on wheels, network overloads may still cause communication delay and frustration to emergency response personnel.

To overcome such problems in the event of a national emergency, the WPA system was developed. Conventional WPA systems provide selected emergency leadership with preemptive access to cellular communication networks. However, conventional WPA systems do not permit calls made to the mobile device of a registered WPA authority. In other words, while mobile devices registered for WPA service may be given priority access for placing calls on the network, there are no provisions in the WPA system enabling those very same mobile devices to receive calls. Incoming calls to mobile devices in a command center may be just as important as outgoing calls. Also, conventional WPA systems assume that if an authorized user needs to make a call, the call will be made from their pre-registered mobile device. However, there may be instances where the authorized personnel do not have their pre-registered mobile device or that mobile device has been damaged. Provisions must be made to enable the authorized personnel access to an overloaded network. Also, emergency personnel who have not previously registered their mobile device on the WPA system cannot access overloaded cellular communication networks "on the fly." Many times, off duty, junior, volunteer emergency response personnel may be the first responders on the scene on an incident. Such personnel may not be entitled to conventional WPA, which is designed to address the needs of the leadership. Thus, precisely the personnel who can quickly alleviate a situation given their proximity on the scene are likely not pre-registered and authorized for conventional WPA.

To overcome these limitations with conventional cellular communication networks and conventional WPA, the various embodiments provide Tiered Priority Access (TPA) capabilities to deliver Quality of Service (QoS)/Grade of Service (GOS) mobile device communications for first responders for calls both originated and terminated at a mobile handset. The various embodiments are particularly aimed at the needs of first responders at the very start of an emergency event.

TPA, as its name implies, aims to provide a tiered response to network capacity requirements. The tiered response mirrors typical communication requirements at the incident scene as more responders appear to help resolve the problem(s) at hand. When an incident occurs, first responders are either at the incident scene or begin to respond. First responders reporting to an incident initially arrive on scene in small numbers and then grow in direct response to the magnitude and severity of the incident.

To accommodate this predictable response, TPA enables an escalation and de-escalation process based upon call volume as first responders arrive on scene and then depart as the situation is restored to normal.

In overview, the various embodiments work as follows. During normal operation, cellular call volume through particular base stations is monitored to determine if the network is reaching capacity limits. Call volume may be monitored based on current calls, attempts to access the network, engaged bandwidth, or other methods known to cellular service providers. Call volume may be locally monitored at the base station 102, at a BSC/RNC 103, or an MSC 104 or, in an embodiment, centrally, such as in a Network Operation Center (NOC). Such monitoring is at the cellular level, since normal emergency situations are most likely to impact one or two cell zones, although TPA will work in a similar fashion in the event of a widespread emergency. When call volume in a cell exceeds a threshold value preselected by the service provider and/or emergency response planners, the system allocates one channel in the affected cell tower to TPA operation. FIG. 2 illustrates a situation in which call volume has exceeded a threshold indicating that TPA should be implemented. As shown in FIG. 2, more mobile devices 101 in the cell supported by the base station 102 are attempting to access the network than the network can connect. As a result, only some of the mobile devices 101a, 101c, 101d, 101e and 101g will be able to place or receive calls (shown as solid black lightning bolts), while others will be denied access to the network (shown as white lightning bolts). In this situation, call volume within the cell served by the base station 102 has exceeded the threshold, so one of the communication channels on the antenna will be allocated to TPA operation. However, the channel remains available to general public use until a TPA-authorized call is placed. Thus, no change in the communication network is shown in FIG. 2.

Figure 3:
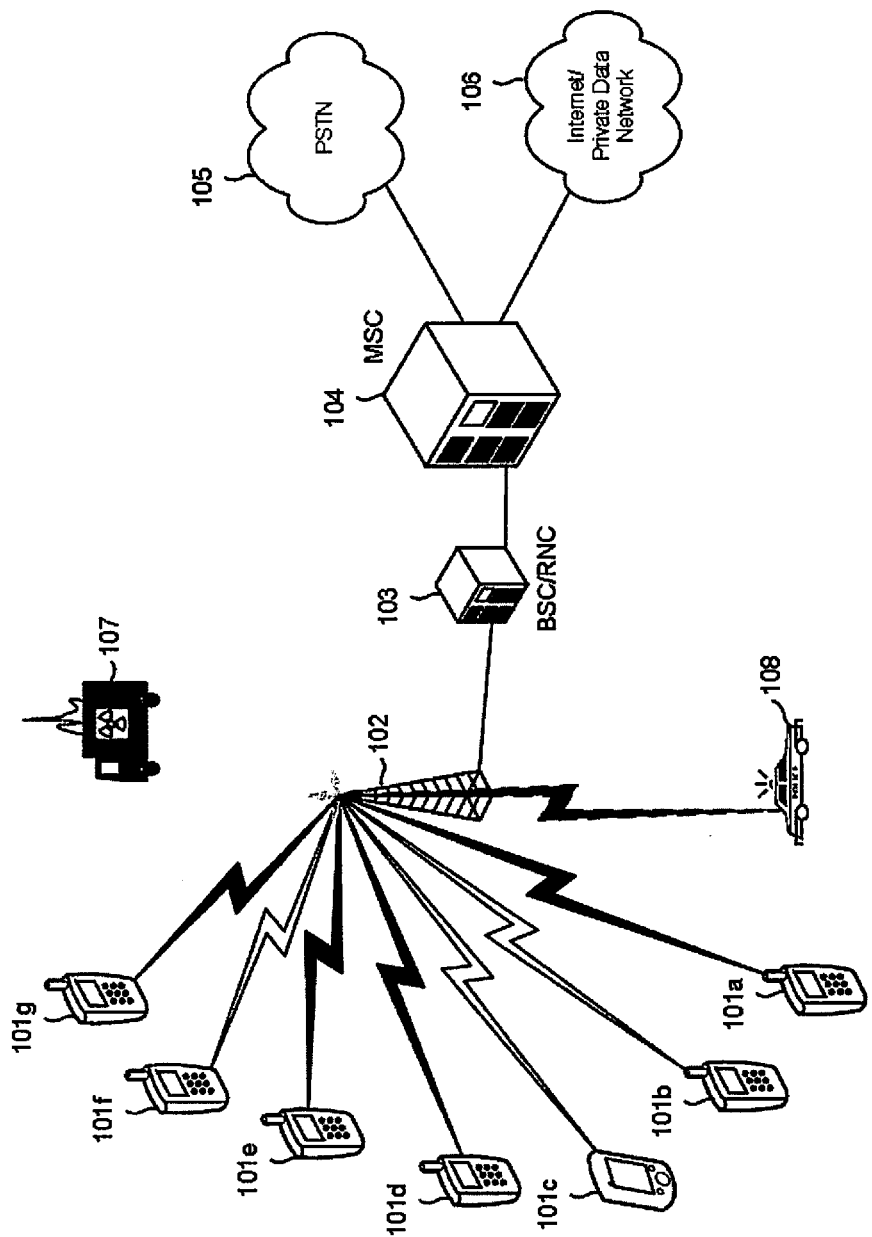
FIG. 3 is a system block diagram illustrating call volume requests made to a cellular communication network under an emergency situation condition when a first responder arrives on the scene.

The various embodiments address this overload condition in order to allow emergency personnel to use the cellular communication network as they arrive on scene, as is illustrated in FIG. 3. When an emergency responder 108 arrives on scene, that individual may initiate a wireless telephone call. If a communications channel has been allocated to TPA operation and the emergency responder's mobile device is pre-registered as a TPA-authorized mobile device, the network can recognize the pre-registered TPA-authorized mobile device from the mobile device's unique ID and recognize the call as a TPA call. The base station 102, BSC/RNC 103 or the MSC 104 then ensure the TPA call is connected. If necessary, the bandwidth allocated to civilian mobile device users is reduced and one or more non-emergency calls may be dropped to enable the TPA call to be connected. This is illustrated in FIG. 3 as the connection to mobile device 101c has been dropped and denied further access to the network (illustrated as a white lightning bolt), and the TPA call (illustrated as a dashed black lightning bolt) by the emergency responder 108 is connected.

Figure 4:
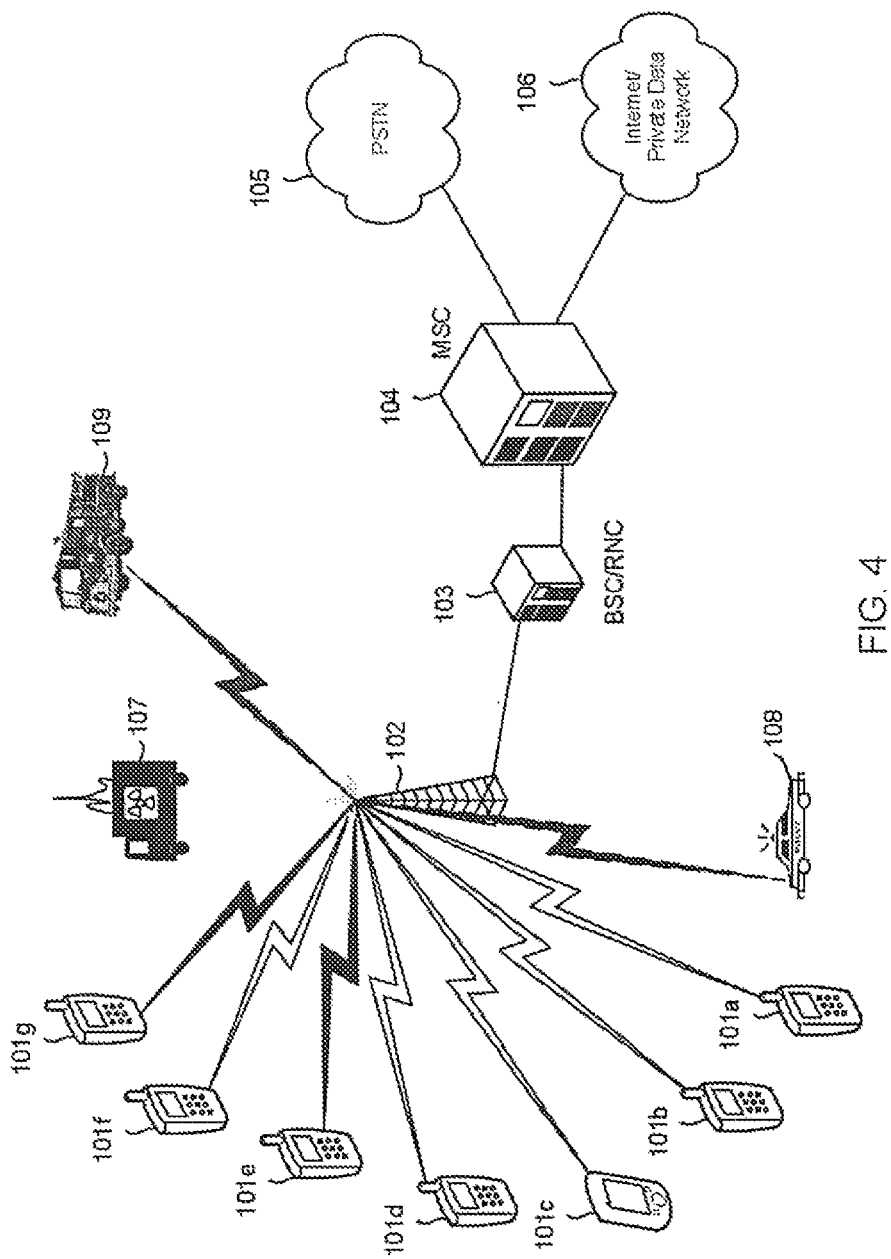
FIG. 4 is a system block diagram illustrating call volume requests made to a cellular communication network as additional emergency response personnel arrive on the scene.

As additional emergency personnel 109 arrive on scene of the emergency, additional TPA calls may need to be connected as illustrated in FIG. 4. To accommodate the increase in TPA calls, additional network resources may be automatically allocated to TPA operation in order to provide emergency responders reliable cellular communications. This is illustrated in FIG. 4 which shows connected TPA calls with police 108 and fire 109 personnel (illustrated as a dashed black lightning bolts), while mobile devices 101c and 101d have been disconnect (illustrated as a white lightning bolts). Automatically allocating more resources to TPA use reduces the bandwidth available to the general public, which will limit general access to the network. However, emergency personnel are provided reliable access to the network so long as the heavy call volume persists.

Figure 5:
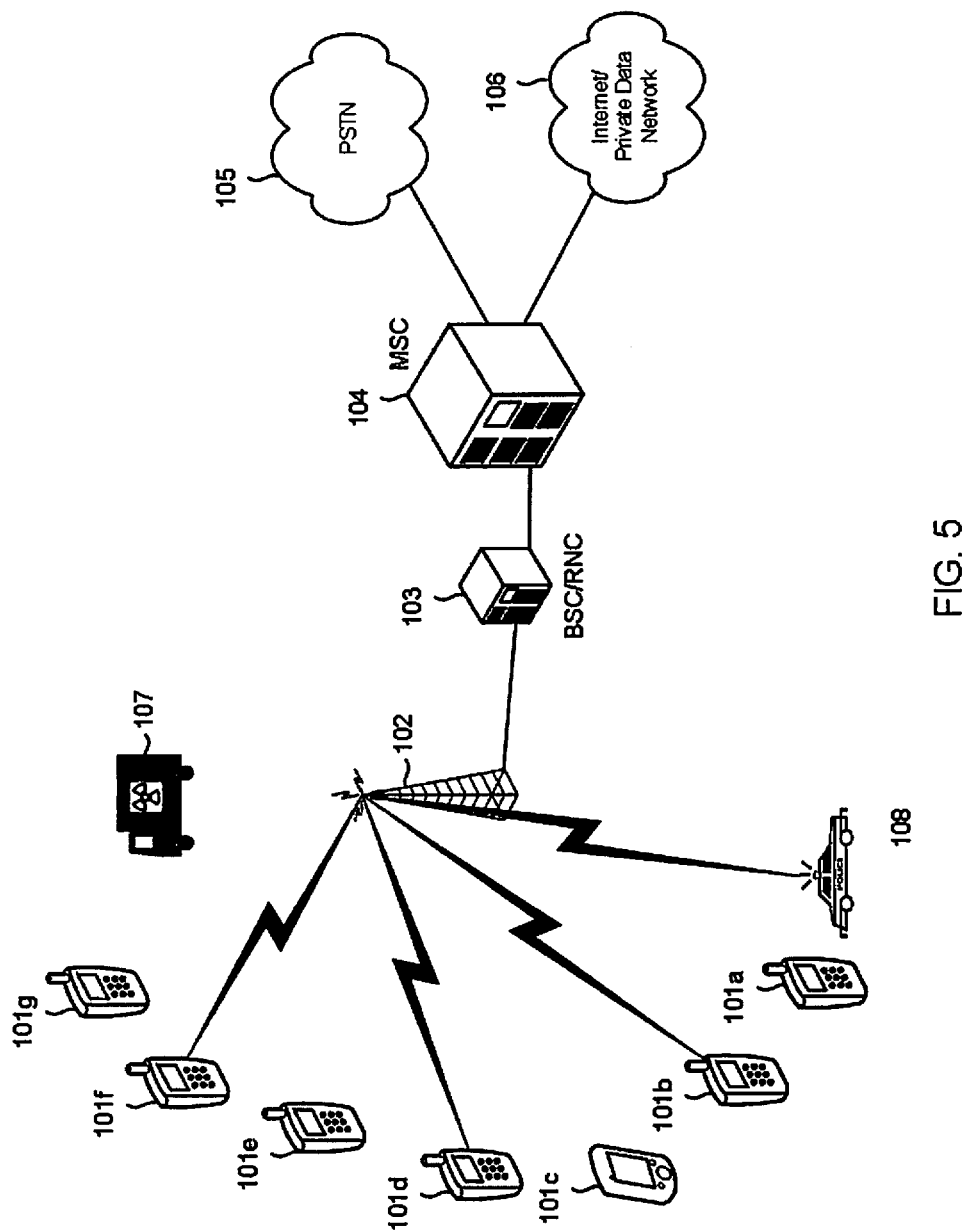
FIG. 5 is a system block diagram illustrating call volume requests made to a cellular communication network after an emergency situation has been alleviated.

Eventually the emergency situation will be resolved and emergency personnel will begin to leave the scene. As conditions return to normal, civilian call volume should return to normal levels while the number of emergency responders requiring TPA-access will also decline. This is illustrated in FIG. 5 which shows that the fire has been extinguished and firemen have left the scene. As traffic begins returning to normal flow fewer general population mobile devices 101(a-g) access the network simultaneously. With cellular communications returning to normal, cellular communications resources may be released from TPA operations, restoring the network to normal operations. As illustrated, the remaining emergency personnel 108 are connected to the cellular communication network in the normal fashion as the call volume has decreased to the point that TPA operation has been terminated.

When TPA operation is implemented on one or more communication channels, the cellular system (e.g., locally in the base station, BSC/RNC, or MSC, or in a central location such as a NOC) monitors incoming and outgoing calls to determine whether any calls are coming from or directed to emergency response personnel. This may be accomplished by recognizing an originating or destination mobile device as being TPA pre-registered mobile device. Alternatively, the system may recognize emergency response personnel when they complete a special dialing procedure such as the *272 dialing procedure described below.

Mobile devices can be pre-registered for TPA use by authorized users. This may be accomplished by registering as a qualified emergency responder (e.g., according to criteria established by governmental authorities) with the cellular network provider. As is well known in the telecommunications art, all mobile devices 101 which access the cellular communication are assigned a unique identification number. In the pre-registration process, the cellular network provider stores the mobile device's unique identification number in a database of authorized TPA personnel. The cellular network provider may also issue the individual a unique Personal Identification Number (PIN) for use in implementing TPA preemption from a non-TPA mobile device as described more fully below.

If the emergency responder's mobile device is not pre-registered (such as a borrowed phone), and the network is overload, the emergency responder may be unable to access network resources. In this situation, the emergency responder can activate the embodiment TPA from a non-registered mobile device 101 by first dialing *272 followed by a personal identification number (PIN) and the telephone number. The nearest base station 102 to the non-registered mobile device 101 receives the transmission from the mobile device 101 indicating that the mobile device is initiating a call. The base station 102 (or BSC/RNC 103 connected to the receiving base station) recognizes the *272 special dialing prefix and starts to route the call to the appropriate destination. Alternatively, recognition and routing of the #272 dialing prefix may be accomplished at the MSC 104. This destination may be the closest Public Safety Answering Point (PSAP) or central location with a database of PINs. The *272 call is similarly processed at the BSC/RNC 103 and later MSC 104 as the call proceeds through the communication network system. The BSC/RNC 103 and MSC 104 controlling the base station antenna 102 and other associated antennae are programmed to recognize the special dialing procedure using a database of pre-registered first responder PINs. This PIN database may be stored at the MSC 104 or at another central location such as a NOC. If the received PIN matches a record in the PIN database, the MSC 104 may immediately give the caller preemptive access to the network just as if the call had been made from a TPA-registered mobile device as described above. In order to support this capability, a TPA-allocated channel reserves sufficient open capacity during TPA-operation to receive and recognize *272 dialed calls. If the communication channel is at capacity and a dialed number does not begin with *272, the call is promptly dropped with no attempt to complete the call. However, if the dialed number begins with *272, the MSC 104 completes the process of comparing the entered PIN to the PIN database and temporarily registering the call as a TPA-authorized mobile device. Non-TPA calls may be dropped if necessary in order to retain sufficient capacity to receive and recognize *272 calls.

While reference is made throughout the application to the MSC 104 monitoring and providing the TPA capability, it should be appreciated by one of skill in the art that other elements of the communication system may implement the various method steps. These elements may include, but are not limited to equipment collocated with the base station antenna 102, the BSC/RNC 103, or a NOC.

Once a mobile device has been recognized as a TPA-phone by means of the *272 dialing procedure, the MSC 104 will track the mobile device and continue to treat it as if it were a TPA-registered mobile device so long as at least one communication channel is allocated to TPA operation. Using the unique identification number assigned to the mobile device, the MSC 104 will recognize subsequent calls from the mobile device as TPA-calls without the need for the user to repeat the *272 dialing procedure. Similarly, the MSC 104 can identify incoming calls to the first responder that should receive TPA preemption service. Thus, a first responder 108 using a non-registered mobile device can register the mobile device "on the fly" when TPA is implemented for both incoming and outgoing calls by using the *272 dialing procedure to call one number (such as a dispatcher or "911").

In an embodiment, a TPA authorized user with a PIN can authenticate any number of mobile devices using the *272 dialing procedure described above. This embodiment will enable first responders, such as a policeman, fireman or emergency medical technician, to "deputize" volunteers, such as military personnel, doctors or retired policemen that they find on the scene, thus creating a reliable ad hoc emergency communication network. Since the temporary TPA-authorization of a mobile device established by the *272 dialing procedure is rescinded as all communication channels in the affected area return to normal operation (i.e. cease TPA operation), there is limited concern that the TPA system could be compromised for subsequent emergencies provided the authorized user's PIN is not revealed. Even if the PIN is revealed, the PIN can be easily changed without significant impact since TPA implementation is expected to be an infrequent, random and episodic event.

In a further embodiment, a user of a TPA-registered mobile device who does not have (or forgot) a PIN can register another phone "on the fly," thereby "deputizing" it for the duration of the TPA event by simply initiating the special dialing procedure on any mobile device. For example, the first responder may use a TPA-registered mobile device to dial the number of the mobile device to be "deputized" followed by *272 (any dialing prefix or postscript may be used). When this call is received by the MSC 104, the *272 prefix or postscript is recognized as indicating that the dialed number is to be treated as a temporary TPA-authorized mobile device, allowing it to store the unique ID of the called mobile device in a database for tracking such temporary TPA authorizations. Using this capability, a first responder can quickly deputize one or more volunteers simply by calling their numbers.

In still a further embodiment, emergency response personnel whose position does not rise to the level of qualifying for pre-registration TPA service or PIN may still be the first emergency personnel on the scene of an emergency situation. The user may use his/her non pre-registered mobile device to initiate a *272 special dialing procedure. The call may be forwarded to a PSAP which may issue a temporary PIN and add the mobile device to the database of temporary TPA authorizations.

Alternatively, if the user initiates a *272 special dialing (or similar dialing procedure such as 911), the call may be forwarded to a PSAP. In large scale crisis situations, the answering PSAP may be disabled or unable to answer quickly due to the large incoming call volume. In such situations, if the *272 call is not answered by the PSAP within a predetermined timeframe, a temporary TPA authorization may be automatically issued. Since the circumstances surrounding the issuance of the temporary TPA authorization have not been fully analyzed by a PSAP operator, it is unclear whether the user receiving the temporary TPA authorization is properly authorized. Accordingly, the temporary TPA authorization may be flagged on the PSAP monitor for possible deactivation.

In a further embodiment, the cellular network is configured to give calls from a TPA-registered mobile device and (optionally) temporary TPA-authorized mobile devices priority when dialing to a civilian (i.e., non-TPA authorized) mobile device within the cell zone(s) implementing TPA operations. When such a call is made, the MSC 104 is programmed to route the call to the dialed mobile device through the communication channel or channels allocated to TPA operation. If a TPA-allocated channel is at capacity when the call from a TPA-authorized mobile device is received for a civilian mobile device, another civilian mobile device call is dropped in order to provide sufficient capacity to complete the call, with the associated preemption process being used to prevent another 911 call from being dropped. This embodiment gives emergency personnel the ability to dial-into an emergency. For example, emergency personnel can use this capacity to call back a civilian who initially called 911 to report an emergency in order to request an update from a potential eye witness. As another example, a first responder can call volunteers within the emergency scene without deputizing their phones, assured of being able to reach the volunteers even though the communications network is otherwise overwhelmed.

TPA operations may be implemented in two embodiments of the present invention. In a first embodiment described below with reference to FIG. 6, one or more cellular communication channels are dedicating to TPA calls, providing emergency personnel with dedicated communication capacity while leaving the remaining communication channels to the general public. In a second embodiment described below with reference to FIG. 7, call preemption for TPA calls is implemented only as a TPA allocated communication channel reaches capacity. These embodiments are described separately below.

Figure 6:
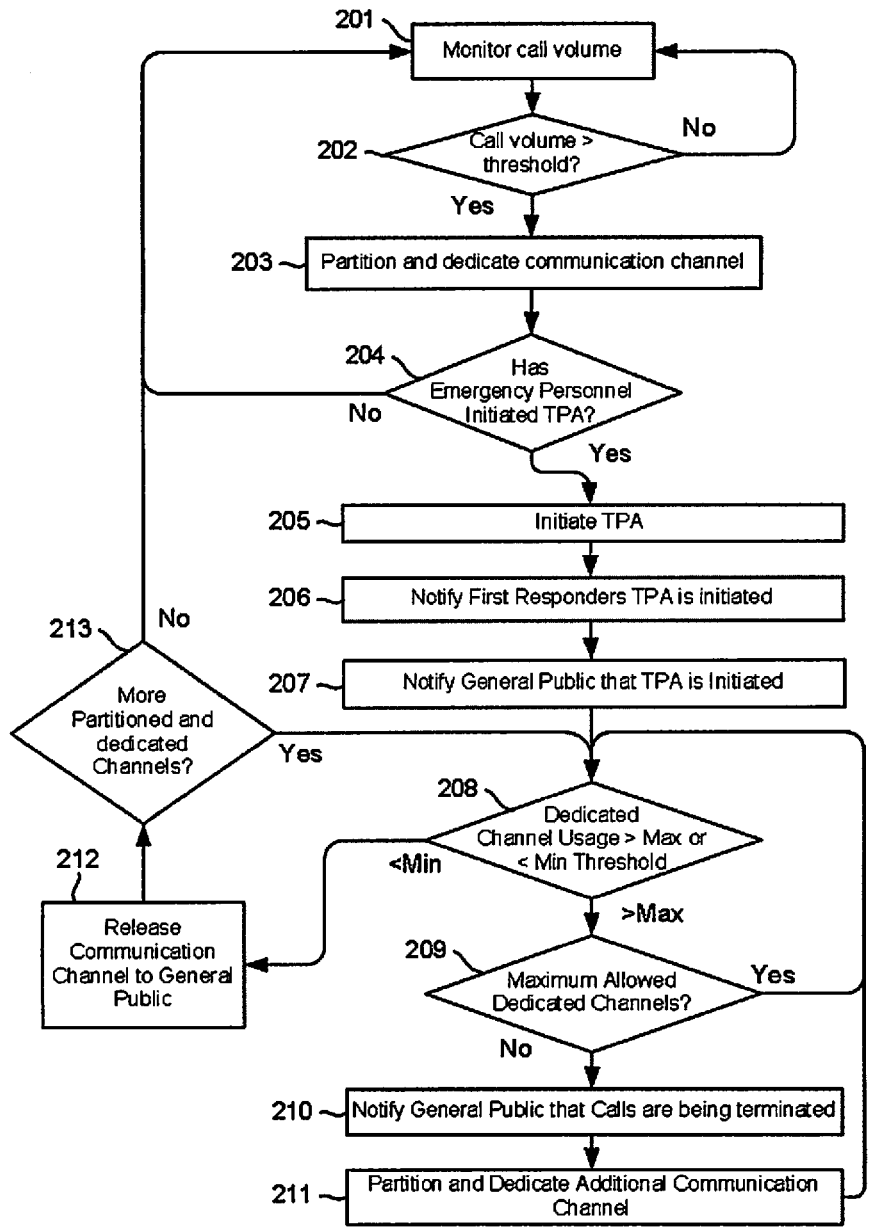
FIG. 6 is a process flow diagram of an embodiment method to manage TPA operations on a network.

FIG. 6 illustrates an example process flow of steps that may be taken to implement the first embodiment of TPA. During normal operations, cellular communication network call volume is monitored, step 201. In particular, the cellular communication network call volume (or number of access requests or engaged bandwidth) are compared against a predetermined threshold (for example 85% of maximum capacity), step 202. If the call volume is below the predetermined threshold a normal situation is assumed to exist, so the monitoring process returns to step 201 to continue monitor call volume. If, however, the call volume (or number of access requests or engaged bandwidth) exceeds the predetermined threshold, an abnormal situation exists which may indicate that an emergency situation is unfolding. To prepare for an emergency situation, network resources (e.g., communication channels on a particular base station antenna) are partitioned and reserved for TPA use, step 203. By automatically allocating a communication channel to TPA use, the system permits a TPA-authorized mobile device to gain access to the network, even when the network is otherwise overloaded. However, TPA preemption does not occur until a TPA-qualified caller attempts to access an overloaded network.

Since the increased call volume may or may not be in response to an emergency situation, a communication channel allocated to TPA continues to function normally, handling civilian (i.e., non-TPA) calls in the ordinary fashion. In instances where the increased call volume is simply due to coincidental network requests and no TPA-qualified user is attempting to place a call, call preemption enabled by TPA is not needed. Thus, the TPA threshold may be exceeded and TPA implemented even when there is no actual emergency incident. Delaying actual implementation of TPA preemption until the service is required by a first responder increases the reliability of the network under normal circumstances.

The system may be informed that an actual emergency situation is occurring by a TPA-authorized emergency response personnel placing a TPA call within the affected cell zone. When the communication channel is in TPA mode, the cellular system (be it at the base station, BSC/RNC/MSC, or in a central location such as a NOC) monitors incoming and outgoing calls to determine whether any emergency response personnel is using a TPA-pre-registered mobile device or has completed a special dialing procedure invoking TPA preemption, step 204. If no emergency response personnel has initiated a call using a TPA-authorized mobile device or the special dialing procedure, then the system continues to monitor access requests, step 204, as well as call volume, step 201, to determine if the communication channel should be released from TPA operation, step 202.

If a call is initiated by a TPA-authorized mobile device, or if the call is generated from a non pre-registered mobile device using the *272 dialing procedure TPA is initiated, step 205. When TPA is initiated, step 205, only emergency personnel previously registered or given clearance "on the fly" will be permitted access to the partitioned and reserved network resources. As noted above, TPA will normally be implemented on a single communication channel initially, leaving the remaining channels to general public use. Then, if TPA-use exceeds the capacity of the TPA-allocated network resources another resource can be converted to TPA operation. By dedicating network resources to emergency personnel use one channel or one resource at a time, the remaining network resources are left available for non-essential general public use. In addition, by dedicating network resources for emergency personnel communication, emergency personnel are able to both send and receive calls on their mobile devices.

In an optional embodiment, upon the initiation of TPA, step 205, the MSC 104 may survey the mobile devices 101 located within the affected cell or serviced by other base station antennae 102 within the same BSC/RNC 103, to identify all registered or temporarily registered first responders. These first responders may then be advised via SMS message (or other methods) that they can utilize the TPA service by placing a call or using the special dialing procedure, step 206.

In a further optional embodiment, the base station 102, BSC/RNC 103, or MSC 104 may also send messages to all non-emergency mobile devices 101(*a-g*) within the affected area/cell 100 advising them to avoid using their mobile device 101(*a-g*) except for Emergency 911 calls and to indicate that emergency services have been notified, step 207. This messaging may be initiated by the PSAP responsible for the incident area, by the local incident Command and Control authority, or by the network service provider. Such messages may be delivered via SMS message or other communication means. The system may also notify callers connected to the channel allocated to TPA use that their calls are being terminated prior to disconnecting the calls.

As the emergency situation continues to unfold and additional emergency response personnel appear on the scene, additional network resources may be required to support emergency personnel communication. Accordingly, the partitioned and dedicated network resource may be monitored to determine if additional network resources should be partitioned and allocated to TPA. This may be accomplished by comparing the call volume on the partitioned and dedicated network resource to a predefined maximum or minimum threshold, step 208. If call volume exceeds a predefined maximum (indicating an escalating situation), for example 25% usage of the partitioned and dedicated network resources in the cell site/sector, additional dedicated network resources may be partitioned to TPA operation, step 211, to allow emergency response personnel to communicate.

In an embodiment, before terminating calls in order to allocate the additional channel to TPA operation, non-essential (i.e., non-emergency personnel) mobile devices 101 that have a call or data sessions in progress with the allocated channel may be informed with a warning tone and/or recorded announcement that their call is being terminated unless a defined code is entered, step 210. This permits first responders to maintain their calls by quickly entering a code (e.g., their PIN). If an in process call is an emergency 911 call, the defined code may be supplied by a PSAP.

In an embodiment, the system will continue to automatically retrieve and re-allocate network resources for emergency response personnel communication until all available network resources are dedicated to emergency response personnel use. Such an embodiment will maximize communication capabilities of emergency response personnel. Other embodiments may reserve at least a minimum portion of network resource (e.g., one communication channel) to enable the general public the ability to alert emergency response personnel to new or developing emergency situation, such as by placing 911 calls. Accordingly, other embodiments may impose maximum limits to the amount of network resources that are taken away from the general population and dedicated to emergency response personnel communication. To accomplish this, the MSC 104 may determine whether the maximum amount of network resources have been partitioned and dedicated to emergency response personnel communication, step 209. If the maximum amount of network resources have already been partitioned and dedicated, then the MSC 104 will continue to monitor the level of utilization of the partitioned and dedicated network resources, step 208. If the maximum amount of network resources that can be partitioned and dedicated has not been reached, then the MSC 104 may (optionally) inform current callers that calls are being terminated, step 210, and reallocate network resources from general population usage to emergency response personnel communication use, step 211. Once the additional communication channel has been dedicated, the MCS 104 will return to monitoring the level of utilization of the partitioned and dedicated network resources to determine if the emergency situation is escalating or de-escalating, step 208.

As emergency response personnel work to alleviate the emergency incident and return conditions to normal, the need for network resources will decrease as emergency personnel exit the scene. To enable the system to return to normal operations, the MSC 104 may continually monitor the call volume on the partitioned and dedicated network resources for an indication of escalation or de-escalation, step 208. When the level of use of the partitioned and dedicated network resource drops below a predefined minimum the MSC 104 may begin to re-allocate network resources back to general public usage, step 212. Network resources may be automatically re-allocated channel by channel, incrementally reducing the resources allocated to emergency personnel usage, returning to normal operations in a stepwise fashion. By demobilizing network resources one channel or network resource at a time, the embodiment provides a flexible communication system which may adapt to the situation as it evolves. If the situation requires more or less network resources for emergency personnel communication, the embodiment system and method can meet the demand while still providing some network resources for the general public to use. The system may wait for a period of time after each release of a TPA-dedicated channel in order to accommodate surges in emergency personnel use during the event wind-down phase, thereby avoiding having to repeat the process of dropping callers, step 210, unnecessarily.

Once the cellular communication channel has been re-allocated for general public usage, the MSC 104 determines if there are any more network resources that are currently partitioned and dedicated for emergency personnel communication, step 213. If additional network resources are currently partitioned and dedicated for emergency personnel communication, the MSC 104 returns to step 208 to determine whether the emergency situation is escalating or de-escalating. As the emergency situation further de-escalates and returns to normal, emergency response personnel require less and less network resources to support their communications. Thus, the MSC 104 will continue to automatically re-allocate network resources to general public usage in response to call volume, step 212, until all network resources are in normal operating configuration for general public use. The MSC 104 then returns to step 201 to monitor call volume waiting for the next emergency situation.

Figure 7:
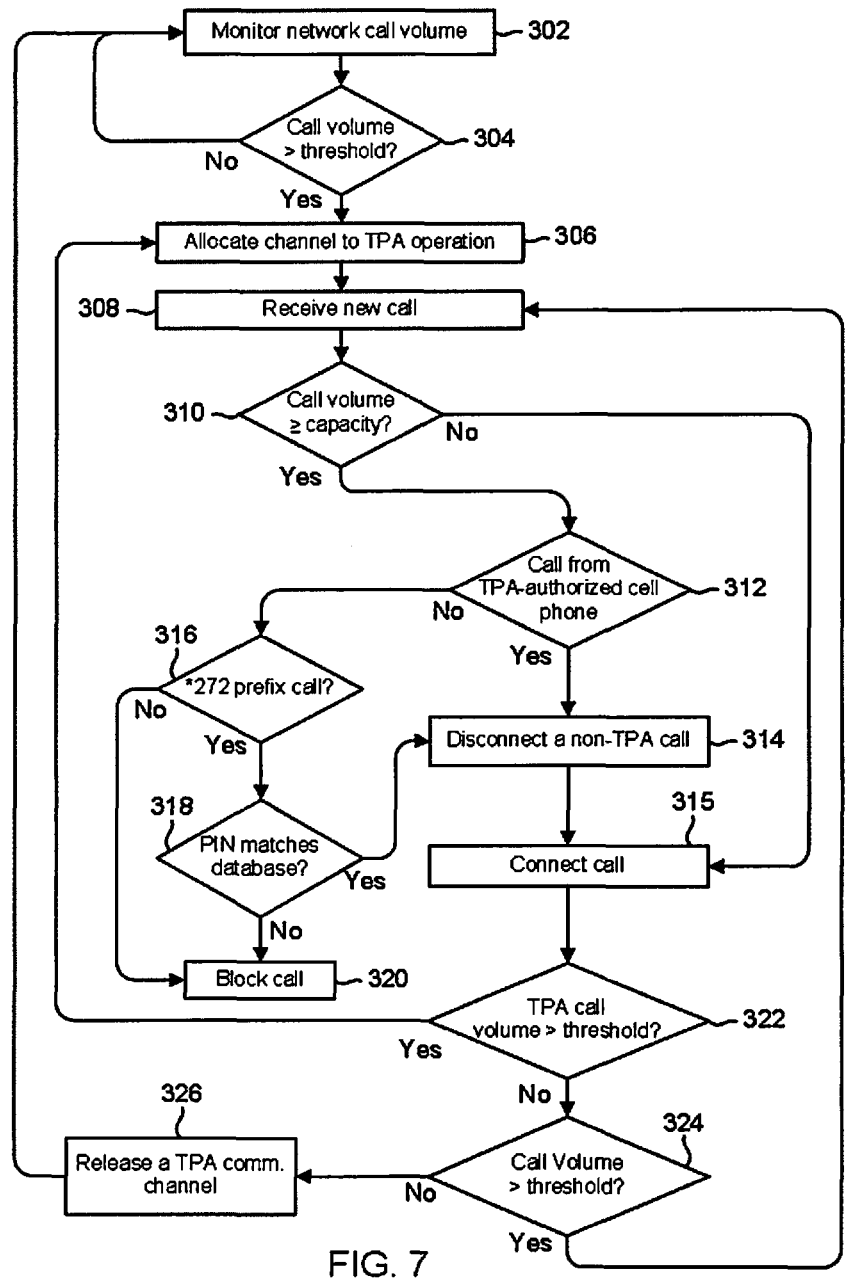
FIG. 7 is a process flow diagram of another embodiment method to manage TPA operations on a network.

In the second embodiment, illustrated in the process flow diagram in FIG. 7, network resources are incrementally allocated to TPA use at level of individual calls by way of call preemption so that public access to the network is maximized while meeting emergency personnel use requirements. During normal operations, cellular communication network usage is monitored, step 302. Network access requests, call volume or engaged bandwidth may be compared to a predetermined threshold (for example 85% of maximum capacity), step 304. If the usage is below the predetermined threshold, a normal situation is assumed to exist, so the monitoring process returns to step 302 to continue monitoring call volume. If, however, the usage exceeds the predetermined threshold, an abnormal situation exists which may indicate that an emergency situation is unfolding. To prepare for an emergency situation, network resources, such as a communication channel on an affected base station antenna, are partitioned and reserved for TPA use, step 306. By automatically allocating a communication channel to TPA use, the system permits a TPA-authorized mobile device to gain access to the network, even when the network is otherwise overloaded. However, TPA preemption does not occur until a TPA-qualified caller attempts to access an overloaded network.

Since the increased call volume may or may not be in response to an emergency situation, a communication channel allocated to TPA continues to function normally, handling civilian (i.e., non-TPA) calls in the ordinary fashion. In instances where the increased call volume is simply due to coincidental call volume and no TPA-qualified user is attempting to place a call, call preemption enabled by TPA is not needed. Thus, the TPA threshold may be exceeded and TPA implemented even when TPA call preemption is not required. Delaying actual implementation of TPA preemption until preemption is required by a first responder increases the reliability of the network under normal circumstances.

With a network resource allocated to TPA operation, the cellular system (be it at the base station, BSC/RNC or in a central location such as an MSC) monitors incoming and outgoing calls, step 308. The TPA-allocated channel continues to function as a normal cellular communication channel until (a) the channel is at capacity (i.e., current call volume through the channel equals its maximum capacity) and (b) a TPA-qualified mobile device attempts to access the network to place or receive a call. Call volume on the TPA-allocated communication channel is monitored to determine if a call must be dropped in order to connect a TPA-qualified call. Thus, when a new call is received (incoming or outgoing) that will be allocated to the TPA-allocated channel, the system may first determine if that channel is presently at capacity (i.e., has as many calls connected as the channel can reliably maintain), step 310. If the channel is not at capacity (i.e., there is excess capacity on the network), the call may be connected, step 315. This monitoring of the TPA channel will prevent disconnecting a civilian call if sufficient capacity exists on the channel to enable connection of a new incoming or outgoing TPA call.

As discussed above, the system can recognize a TPA-authorized call by determining if the source or destination mobile device is a TPA-registered mobile device, step 312, and if not by the caller completing a special dialing procedure invoking TPA preemption, step 316. If the caller is using (or the call is placed to) a TPA-registered mobile device, at least one non-TPA call connected on the TPA-allocated channel, step 314, in order to release capacity sufficient to connect the TPA call, step 315. This allows the TPA-qualified first responder to make a call without delay even though the network is at capacity. Similarly, if an incoming call is directed to a TPA-qualified mobile device, at least one non-TPA call on the TPA channel is terminated in order to connect the incoming call to the TPA-qualified mobile device. The process of terminating non-TPA calls from the allocated channel will continue as more calls to TPA-qualified mobile devices access the network.

If the caller is not using a TPA-registered phone and did not enter a *272 type dialing sequence, then the call is blocked, step 320, as a non-emergency call at a time when system resources are at capacity. If the caller has entered the special dialing sequence (such as *272 plus a PIN), the entered PIN is compared to PIN values stored in a database (e.g., at the base station 102, BSC/RNC 103, or MSC 104,), step 318. If the PIN matches a registered emergency personnel, a non-TPA call connected on the TPA allocated channel may be disconnected, step 314, in order to release capacity sufficient to connect the TPA call, step 315.

The system will also monitor call volume on the TPA-allocated channel, step 322 to ensure sufficient capacity remains to accommodate further emergency personnel requirements. TPA-call volume (i.e., the volume of calls to/from TPA-qualified mobile devices) on a TPA-allocated communication channel may be compared to a threshold value in step 322 to determine when to allocate another communication channel to TPA use. If the TPA call volume threshold is exceeded (i.e., test 322="Yes"), another channel will be allocated to TPA functions step 306 (see description of this step above).

TPA-call volume on each TPA-allocated channel, step 322, as well as call volume on all channels, step 324, continue to be monitored to determine when TPA calls are no longer being made, as will occur when the emergency is resolved and first responders leave the scene, or when total call volume returns to a level at which TPA operation is no longer required. If call volume continues to exceed the TPA threshold, then the system will continue to operate at least one channel in TPA mode, accepting calls, step 308, checking for TPA channel call volume, step 310 and connecting calls, step 315, if the call is from/to a TPA authorized mobile device step 312 or if call volume is less than capacity. As TPA-call volume declines, the number of channels allocated to TPA-operation can be reduced by releasing a TPA channel, step 326. The monitoring call volume and releasing of channels from TPA allocation will continue until all communication channels are returned to normal operations. Also, if call volume on non-TPA channels drops back to normal, the system may deactivate TPA operation on all allocated channels since the normal capacity of the network can accommodate TPA-qualified callers without the need for TPA preemption.

This second embodiment allows TPA-allocated channels to be operated in a fashion that ensure every TPA-authorized caller can access the network while providing maximum bandwidth possible to the general public. Monitoring of TPA channel call volume allows the system to avoid dropping civilian calls if sufficient capacity exists on the channel to enable connection of a new incoming or outgoing TPA call. If no emergency response personnel has initiated a call using a TPA-authorized mobile device or the special dialing procedure, then the system continues to monitor access requests, step 308, as well as the call volume, step 324, to determine if the communication channel should be released from TPA operation, step 326.

An additional embodiment provides prioritizing access to TPA-dedicated network resources to enable highest priority callers to use the cellular communication network. In a situation where the number of emergency responders can exceed the capacity of the cellular network resources, this embodiment enables high priority users, such as national leadership and on-site commanders, to preempt other, lower priority users in order to gain instant access to the network. High priority users can use their pre-registered mobile devices to gain access to the network. The unique ID of their mobile devices can be used to determine the priority of the user from a database of unique IDs. Similarly, high priority users can identify themselves to the network using the special dialing procedure, with their PIN providing sufficient information for the network (e.g., the MSC 104) to determine the priority of the user from a database of PINs. Using the priority value determined from a database, the network (e.g., the MSC 104) can determine whether the present caller has a higher priority than any callers already connected to TPA-allocated network resources. Assuming the mobile device 101 is properly authorized, the call will be given priority in the queue on the TPA-allocated network resource so that the emergency personnel member using the pre-registered authorized mobile device will be able to complete the call. If the network resource is at capacity, a call from a person with a lower priority level may be dropped in order to free up sufficient capacity to complete the call.

Figure 8:
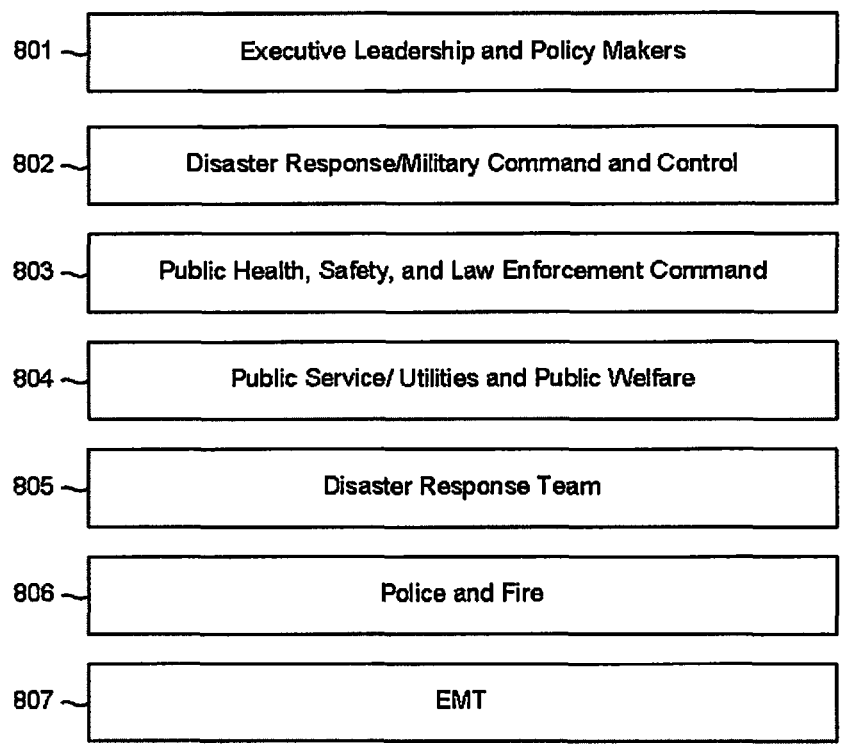
FIG. 8 is an example hierarchical table of classes of users given priority access to emergency communication resources.

FIG. 8 illustrates an example hierarchy of emergency response personnel. As shown in FIG. 8, Executive Leaders and Policy Makers 801 may be given highest priority status. Members of this class cab pre-register their mobile devices 101 such that the mobile device 101 unique identifier is stored in a hierarchy database. If a call is placed from any mobile device pre-registered to a member of the executive leader and policy maker class 801, the call is placed first in any queue of partitioned and dedicated network resources. Similarly, Disaster Response/Military Command and Control personnel 802 may be provided the next highest priority class. Lower level priority may be afforded to line police and firefighters 806 and emergency medical technicians 807. In all cases, mobile devices may be pre-registered so their unique identifiers and/or the user's PIN can be stored in a hierarchy database to support this embodiment.

The foregoing embodiments may also be implemented in a cellular system using a deployable "switch on wheels" cellular communication system. Since such systems may be implemented in large scale emergency/disaster situations with access limited to emergency responders and command authority, network overload will occur from too many authorized (i.e., non-civilian) users placing calls at the same time. To ensure reliable communications in such cases, the deployable switch on wheels can implement the caller priority embodiment so that callers with highest priority (e.g., national and regional commanders) have assured access to cellular communications, while lowest priority authorized users may be disconnected if necessary. In this embodiment, a database of authorized users indicating individual priority (hierarchy) levels (e.g., illustrated in FIG. 8) may be maintained in a server within the deployable switch on wheels.

The foregoing embodiments have been described as being implemented by the MSC 104. One of skill in the art would appreciate that the foregoing embodiments may be implemented within a number computer switching system elements within the cellular communications network, including but not limited to the base station 102, BSC/RNC 103 or NOC. Monitoring of call volume on communication channels and within a cell is performed automatically already. Such systems may be reprogrammed to implement the foregoing embodiments so that the implementation of TPA operations is performed automatically. Thus, the system can automatically recognize when call volumes exceed thresholds so that a communication channel should be allocated to TPA operation. The system can further recognize TPA authorized calls as described above and dedicate network resources and perform the call connections and disconnections described above automatically. Similarly, as call volume declines below the TPA threshold levels, the systems can automatically return the network to normal configuration. In this manner, the cellular communication network can respond to emergency situations to enable assured communications for emergency personnel without the need for human action or intervention. For example, even if an event goes unreported (e.g., no one bothers to dial 911), the system will nevertheless respond to excess call volume to enable an emergency responder to use the network. This capability also ensures police, fire and EMT personnel (typical individuals who may be authorized to implement TPA) can use the cellular communication network during times of peak usage, such as during rush hour on the freeway or following conclusion of a major sporting event.

The hardware used to implement the forgoing embodiments may be processing elements and memory elements configured to execute a set of instructions, wherein the set of instructions are for performing method steps corresponding to the above methods. Such processing and memory elements may be in the form of computer-operated switches, servers, workstations and other computer systems used in cellular communications centers and remote facilities (e.g., base station antenna locations). Some steps or methods may be performed by circuitry that is specific to a given function.

Those of ordinary skill in the art will appreciate that the various illustrative logical blocks, modules, computer systems, and algorithm steps described in connection with the embodiments disclosed herein may be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware, firmware, or software depends upon the particular application and design constraints imposed on the overall system. Those of ordinary skill in the art may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. The software module may reside in a processor readable storage medium and/or processor readable memory both of which may be any of RAM memory, flash memory, ROM memory, EPROM memory, EEPROM memory, registers, hard disk, a removable disk, a CD-ROM, or any other tangible form of data storage medium known in the art. Moreover, the processor readable memory may comprise more than one memory chip, memory internal to the processor chip, in separate memory chips, and combinations of different types of memory such as flash memory and RAM memory.

The foregoing description of the various embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, and instead the claims should be accorded the widest scope consistent with the principles and novel features disclosed herein.

What is claimed is:

1. A communication method, comprising:
   allocating a subset of a plurality of wireless telecommunication network resources for use by mobile devices of authorized emergency personnel, the allocated subset of wireless telecommunication network resources including a communication channel on a base station antenna;
   allowing general access to the allocated communication channel on the base station antenna so long as no call is made from or to an authorized emergency personnel mobile device;
   monitoring the allocated communication channel on the base station antenna to determine whether call volume is at or near capacity of the allocated communication channel on the base station antenna;
   monitoring incoming and outgoing calls to determine whether a new call is to or from an authorized emergency personnel mobile device;
   disconnecting an ongoing general access call using the allocated communication channel on the base station antenna in response to determining that call volume is at or near capacity and determining that the new call is to or from the authorized emergency personnel mobile device; and
   connecting the new call to or from the authorized emergency personnel mobile device via the allocated communication channel on the base station antenna in response to disconnecting the general access call.

2. The communication method of claim 1, wherein determining whether a new call is to or from an authorized emergency personnel mobile device comprises:
   recognizing the authorized emergency personnel mobile device as a pre-registered tiered priority access (TPA) authorized mobile device from a mobile device identification value input on the authorized emergency personnel mobile device.

3. The communication method of claim 1, further comprising:
   automatically allocating an additional subset of the plurality of wireless telecommunication network resources for use by mobile devices of authorized emergency personnel in response to determining that call volume is at or near capacity and that the new call is to or from the authorized emergency personnel mobile device.

4. The communication method of claim 1, further comprising:
   automatically releasing at least a portion of the allocated wireless telecommunication network resources in response to determining that call volume is not at or near capacity.

5. The communication method of claim 1, further comprising:
   automatically sending a communication message to a plurality of authorized emergency personnel mobile devices in a coverage area of the allocated wireless telecommunication network resources notifying them of the availability of telecommunication network resources.

6. The communication method of claim 5, wherein automatically sending a communication message comprises automatically sending at least one of a short message service (SMS) message and a multimedia messaging service (MMS) message.

7. The communication method of claim 5, further comprising:
   automatically sending a communication message to a plurality of general access users within the coverage area of the allocated wireless telecommunication network resources in response to determining that call volume is at or near capacity and the new call is to or from the authorized emergency personnel mobile device.

8. The communication method of claim 5, wherein disconnecting an ongoing general access call in response to determining that call volume is at or near capacity and the new call is to or from the authorized emergency personnel mobile device comprises:
   sending a mobile device associated with the ongoing general access call a warning message;
   receiving user input on the mobile device associated with the ongoing general access call in response to sending the warning message; and
   authorizing the mobile device associated with the ongoing general access call as another authorized emergency personnel mobile device and disconnecting a different ongoing general access call in response to receiving the user input.

9. An emergency cellular communication system, comprising:
   a plurality of base stations which include a plurality of communication channels, each of the plurality of communication channels being capable of establishing voice and data telecommunications links with mobile devices;
   a central processor coupled to the plurality of base stations, wherein the central processor is configured with processor-executable instructions to perform operations comprising:
      allocating a subset of a plurality of wireless telecommunication network resources for use by mobile devices of authorized emergency personnel, the allocated subset of wireless telecommunication network resources including a communication channel on a base station antenna;
      allowing general access to the allocated communication channel on the base station antenna so long as no call is made from or to an authorized emergency personnel mobile device;
      monitoring the allocated communication channel on the base station antenna to determine whether call volume is at or near capacity of the communication channel on the base station antenna;
      monitoring incoming and outgoing calls to determine whether a new call is to or from an authorized emergency personnel mobile device;
      disconnecting an ongoing general access call using the allocated communication channel on the base station antenna in response to determining that call volume is at or near capacity and determining that the new call is to or from the authorized emergency personnel mobile device; and
      connecting the new call to or from the authorized emergency personnel mobile device via the allocated communication channel on the base station antenna in response to disconnecting the general access call.

10. The emergency cellular communication system of claim 9, wherein the central processor is configured with processor-executable instructions such that determining whether a new call is to or from an authorized emergency personnel mobile device comprises recognizing the authorized emergency personnel mobile device as a pre-registered tiered priority access (TPA) authorized mobile device in response to receiving a mobile device identification value from the authorized emergency personnel mobile device.

11. The emergency cellular communication system of claim 9, wherein the central processor is configured with processor-executable instructions to perform operations further comprising:
   automatically allocating an additional subset of the plurality of wireless telecommunication network resources for use by mobile devices of authorized emergency personnel in response to determining that call volume is at or near capacity and that the new call is to or from the authorized emergency personnel mobile device.

12. The emergency cellular communication system of claim 9, wherein the central processor is configured with processor-executable instructions to perform operations further comprising:
   automatically releasing at least a portion of the allocated wireless telecommunication network resources in response to determining that call volume is not at or near capacity.

13. The emergency cellular communication system of claim 9, wherein the central processor is configured with processor-executable instructions to perform operations further comprising:
   automatically sending a communication message to a plurality of authorized emergency personnel mobile devices in a coverage area of the allocated wireless telecommunication network resources notifying them of the availability of network resources.

14. The emergency cellular communication system of claim 13, wherein the central processor is configured with processor-executable instructions such that automatically sending a communication message comprises automatically sending at least one of a short message service (SMS) message and a multimedia messaging service (MMS) message.

15. The emergency cellular communication system of claim 13, wherein the central processor is configured with processor-executable instructions to perform operations further comprising:
   automatically sending a communication message to a plurality of general access users within the coverage area of the allocated wireless telecommunication network resources in response to determining that call volume is at or near capacity and the new call is to or from the authorized emergency personnel mobile device.

16. The emergency cellular communication system of claim 13, wherein the central processor is configured with processor-executable instructions such that disconnecting an ongoing general access call in response to determining that call volume is at or near capacity and the new call is to or from the authorized emergency personnel mobile device comprises:
   sending a mobile device associated with the ongoing general access call a warning message;
   receiving user input from the mobile device associated with the ongoing general access call in response to sending the warning message; and
   authorizing the mobile device associated with the ongoing general access call as another authorized emergency personnel mobile device and disconnecting a different ongoing general access call in response to receiving the user input.

17. A non-transitory processor-readable tangible storage medium having stored thereon processor-executable software instructions configured to cause a processor in a cellular communication network to perform operations comprising:
   allocating a subset of a plurality of wireless telecommunication network resources for use by mobile devices of authorized emergency personnel, the allocated subset of wireless telecommunication network resources including a communication channel on a base station antenna;
   allowing general access to the allocated communication channel on the base station antenna so long as no call is made from or to an authorized emergency personnel mobile device;
   monitoring the allocated communication channel on the base station antenna to determine whether call volume is at or near capacity of the allocated communication channel on the base station antenna;
   monitoring incoming and outgoing calls to determine whether a new call is to or from an authorized emergency personnel mobile device;
   disconnecting an ongoing general access call using the allocated communication channel on the base station antenna in response to determining that call volume is at or near capacity and determining that the new call is to or from the authorized emergency personnel mobile device; and connecting the new call to or from the authorized emergency personnel mobile device via the allocated communication channel on the base station antenna in response to disconnecting the general access call.

18. The non-transitory processor-readable tangible storage medium of claim 17, wherein the stored processor-executable software instructions are configured to cause a processor in a cellular communication network to perform operations such that determining whether a new call is to or from an authorized emergency personnel mobile device comprises recognizing the authorized emergency personnel mobile device as a pre-registered tiered priority access (TPA) authorized mobile device from a mobile device identification value input on the authorized emergency personnel mobile device.

19. The non-transitory processor-readable tangible storage medium of claim 17, wherein the stored processor-executable software instructions are configured to cause a processor in a cellular communication network to perform operations comprising:

automatically allocating an additional subset of the plurality of wireless telecommunication network resources for use by mobile devices of authorized emergency personnel in response to determining that call volume is at or near capacity and that the new call is to or from the authorized emergency personnel mobile device.

20. The non-transitory processor-readable tangible storage medium of claim 17, wherein the stored processor-executable software instructions are configured to cause a processor in a cellular communication network to perform operations comprising:

automatically releasing at least a portion of the allocated wireless telecommunication network resources in response to determining that call volume is not at or near capacity.

21. The non-transitory processor-readable tangible storage medium of claim 17, wherein the stored processor-executable software instructions are configured to cause a processor in a cellular communication network to perform operations comprising:

automatically sending a communication message to a plurality of authorized emergency personnel mobile devices in a coverage area of the allocated wireless telecommunication network resources notifying them of the availability of network resources.

22. The non-transitory processor-readable tangible storage medium of claim 21, wherein the stored processor-executable software instructions are configured to cause a processor in a cellular communication network to perform operations such that automatically sending a communication message comprises automatically sending at least one of a short message service (SMS) message and a multimedia messaging service (MMS) message.

23. The non-transitory processor-readable tangible storage medium of claim 21, wherein the stored processor-executable software instructions are configured to cause a processor in a cellular communication network to perform operations comprising:

automatically sending a communication message to a plurality of general access users within the coverage area of the allocated wireless telecommunication network resources in response to determining that call volume is at or near capacity and the new call is to or from the authorized emergency personnel mobile device.

24. The non-transitory processor-readable tangible storage medium of claim 21, wherein the stored processor-executable software instructions are configured to cause a processor in a cellular communication network to perform operations such that disconnecting an ongoing general access call in response to determining that call volume is at or near capacity and the new call is to or from the authorized emergency personnel mobile device comprises:

sending a mobile device associated with the ongoing general access call a warning message;

receiving user input from the mobile device associated with the ongoing general access call in response to sending the warning message; and authorizing the mobile device associated with the ongoing general access call as another authorized emergency personnel mobile device and disconnecting a different ongoing general access call in response to receiving the user input.

* * * * *